United States Patent
Ahn et al.

(10) Patent No.: US 10,072,740 B2
(45) Date of Patent: Sep. 11, 2018

(54) TRANSMISSION FOR HYBRID VEHICLE

(71) Applicant: Hyundai Motor Company, Seoul (KR)

(72) Inventors: Chul Min Ahn, Busan (KR); Seok Joon Kim, Yongin-si (KR); Jun Young Ha, Ulsan (KR); Baek Yu Kim, Suwon-si (KR); Sung Gon Byun, Anyang-si (KR)

(73) Assignee: Hyundai Motor Company, Seoul (KR)

( * ) Notice: Subject to any disclaimer, the term of this patent is extended or adjusted under 35 U.S.C. 154(b) by 545 days.

(21) Appl. No.: 14/856,357

(22) Filed: Sep. 16, 2015

(65) Prior Publication Data

US 2016/0333986 A1 Nov. 17, 2016

(30) Foreign Application Priority Data

May 14, 2015 (KR) .................. 10-2015-0067242

(51) Int. Cl.
*B60K 6/365* (2007.10)
*B60K 6/48* (2007.10)
*F16H 3/72* (2006.01)

(52) U.S. Cl.
CPC ............. *F16H 3/728* (2013.01); *B60K 6/365* (2013.01); *B60K 6/48* (2013.01); *B60K 2006/4816* (2013.01); *B60Y 2200/92* (2013.01); *B60Y 2400/73* (2013.01); *F16H 2200/201* (2013.01); *F16H 2200/2038* (2013.01); *F16H 2200/2066* (2013.01); *F16H 2200/2082* (2013.01); *Y10S 903/911* (2013.01)

(58) Field of Classification Search
CPC .......... B60K 6/365; B60K 6/405; B60K 6/48; B60K 2006/4816; F16H 3/728; F16H 2200/201; F16H 2200/2038; F16H 2200/2066; F16H 2200/2082; B60Y 2200/92; B60Y 2400/73; Y10S 903/911
See application file for complete search history.

(56) References Cited

U.S. PATENT DOCUMENTS

| | | | |
|---|---|---|---|
| 7,282,004 B2 * | 10/2007 | Raghavan | B60K 6/365 475/5 |
| 7,329,201 B2 | 2/2008 | Raghavan et al. | |
| 7,963,874 B2 | 6/2011 | Conlon | |

(Continued)

FOREIGN PATENT DOCUMENTS

| | | |
|---|---|---|
| JP | 2006-341648 A | 12/2006 |
| JP | 2008-207657 A | 9/2008 |

(Continued)

*Primary Examiner* — Terry C Chau
(74) *Attorney, Agent, or Firm* — Morgan, Lewis & Bockius LLP (57) ABSTRACT

A transmission for a hybrid vehicle may include an input shaft into which power generated by an engine is input, an output shaft disposed coaxially with the input shaft, a first planetary gear set, a second planetary gear set, and a third planetary gear set disposed between the input shaft and the output shaft to transmit rotational force, each of the first to third planetary gear sets having first, second and third rotary elements, a first motor generator and a second motor generator each connected to the first to third rotary elements of the first to third planetary gear sets, and at least three shifting elements each connected to the first to third rotary elements of the first to third planetary gear sets.

7 Claims, 5 Drawing Sheets

(56) References Cited

U.S. PATENT DOCUMENTS

| | | | | |
|---|---|---|---|---|
| 8,038,571 | B2* | 10/2011 | Tabata | B60K 6/442 |
| | | | | 477/3 |
| 8,348,797 | B2* | 1/2013 | Foster | B60K 6/365 |
| | | | | 475/116 |
| 8,475,312 | B2* | 7/2013 | Park | B60K 6/365 |
| | | | | 475/276 |
| 2007/0032327 | A1* | 2/2007 | Raghavan | B60K 6/365 |
| | | | | 475/5 |
| 2012/0149515 | A1 | 6/2012 | Holmes et al. | |

FOREIGN PATENT DOCUMENTS

| | | |
|---|---|---|
| JP | 2009-90830 A | 4/2009 |
| JP | 2009-248825 A | 10/2009 |
| JP | 2010-116940 A | 5/2010 |
| KR | 10-1262981 B1 | 5/2013 |
| KR | 10-2014-0080636 A | 7/2014 |
| KR | 10-2014-0080638 A | 7/2014 |

* cited by examiner

| Mode | OD/B | BK1 | BK2 | Remarks |
|---|---|---|---|---|
| EV1 | | ● | | EV Mode Execution (MG2 Driving) |
| EV2 | | | ● | High-Speed EV2 Driving |
| HEV1 | | ● | | 1st-Stage HEV Mode |
| HEV2 | | | ● | 2nd-Stage HEV Mode |
| OD1 | ● | ● | | High-Speed Fixed Gear Execution |
| OD2 | ● | | ● | |

TRANSMISSION FOR HYBRID VEHICLE

CROSS REFERENCE TO RELATED APPLICATION

The present application claims priority to Korean Patent Application Number 10-2015-0067242 filed May 14, 2015, the entire contents of which is incorporated herein for all purposes by this reference.

BACKGROUND OF THE INVENTION

Field of the Invention

The present invention generally relates to a transmission for a hybrid vehicle. More particularly, the present invention relates to the structure of a power split parallel-type hybrid transmission.

Description of Related Art

Power split parallel-type hybrid transmissions can be designed to divide power generated by an engine into a mechanical power flow based on planetary gears and an electric power flow based on a motor, a generator, and a battery. It is possible to operate the engine independently of an output shaft, freely turn on or off the engine during traveling, and enable an electric vehicle mode. In addition, it is possible to efficiently operate the engine due to the effect of an electrically variable transmission (EVT) enabled by two motor generators without any power-disconnecting mechanism.

It is preferable that a transmission for a hybrid vehicle obtain a sufficient amount of drive force while using a smaller motor by obtaining a sufficient reduction gear ratio. This can consequently reduce the weight of a vehicle and increase the energy efficiency of the vehicle, thereby improving the fuel efficiency of the vehicle, such that the appropriate and efficient high-speed driving performance of the vehicle can be obtained.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a transmission for a hybrid vehicle able to obtain a sufficient amount of drive force while using a smaller motor by obtaining a sufficient reduction gear ratio. This can consequently reduce the weight of a vehicle and increase the energy efficiency of the vehicle, thereby improving the fuel efficiency of the vehicle, such that the appropriate and efficient high-speed driving performance of the vehicle can be obtained.

According to various aspects of the present invention, a transmission for a hybrid vehicle may include an input shaft into which power generated by an engine is input, an output shaft disposed coaxially with the input shaft, a first planetary gear set, a second planetary gear set, and a third planetary gear set disposed between the input shaft and the output shaft to transmit rotational force, each of the first to third planetary gear sets having first, second and third rotary elements, a first motor generator and a second motor generator each connected to the first to third rotary elements of the first to third planetary gear sets, and at least three shifting elements each connected to the first to third rotary elements of the first to third planetary gear sets, in which the first rotary element of the first planetary gear set may be continuously connected to the first motor generator, and may be fixable by a first shifting element of the shifting elements, the second rotary element of the first planetary gear set may be continuously connected to the input shaft, and the third rotary element of the first planetary gear set may be continuously connected to the third rotary element of the second planetary gear set, the second rotary element of the third planetary gear set, and the output shaft, the first rotary element of the second planetary gear set may be fixable by a second shifting element of the shifting elements, the second rotary element of the second planetary gear set may be fixable by a third shifting element of the shifting elements, and may be continuously connected to the third rotary element of the third planetary gear set, and the first rotary element of the third planetary gear set may be continuously connected to the second motor generator.

The first planetary gear set, the second planetary gear set, and the third planetary gear set may be sequentially arranged along an axial direction of the input shaft and the output shaft.

The third shifting element fixing the second rotary element of the second planetary gear set may be a first brake disposed between the second rotary element of the second planetary gear set and a transmission casing, the second shifting element fixing the first rotary element of the second planetary gear set may be a second brake disposed between the first rotary element of the second planetary gear set and the transmission casing, and the first shifting element fixing the first rotary element of the first planetary gear set may be an overdrive brake disposed between the first rotary element of the first planetary gear set and the transmission casing.

The transmission may further include a rotation restraining element on the input shaft, the rotation restraining element being able to restrain rotation of the input shaft.

The rotation restraining element may be a one-way clutch disposed between the input shaft and a transmission casing, allowing the input shaft to rotate only in a single direction.

According to various aspects of the present invention, a transmission for a hybrid vehicle may include a first planetary gear set, a second planetary gear set, and a third planetary gear set, each of which has first, second and third rotary elements, three shifting elements able to variably provide frictional force, a first motor generator and a second motor generator, and first, second, third, fourth, fifth, and sixth rotary shafts connected to the three rotary elements of the planetary gear sets, in which the first rotary shaft may be an input shaft directly connected to the second rotary element of the first planetary gear set, the second rotary shaft may be directly connected to the first rotary element of the first planetary gear set and the first motor generator, the third rotary shaft may be directly connected to the first rotary element of the second planetary gear set, the fourth rotary shaft may be directly connected to the second rotary element of the second planetary gear set and the third rotary element of the third planetary gear set, the fifth rotary shaft may be directly connected to the first rotary element of the third planetary gear set and the second motor generator, the sixth rotary shaft may be an output shaft directly connected to the third rotary element of the first planetary gear set, the third rotary element of the second planetary gear set, and the second rotary element of the third planetary gear set, the three shifting elements may include a first brake disposed between the fourth rotary shaft and a transmission casing, a second brake disposed between the third rotary shaft and the transmission case, and an overdrive brake disposed between the second rotary shaft and the transmission casing.

According to the present invention, the transmission for a hybrid vehicle can obtain a sufficient amount of drive force while using a smaller motor by obtaining a sufficient reduction gear ratio. This can consequently reduce the weight of a vehicle and increase the energy efficiency of the vehicle, thereby improving the fuel efficiency of the vehicle, such that the appropriate and efficient high-speed driving performance of the vehicle can be obtained.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
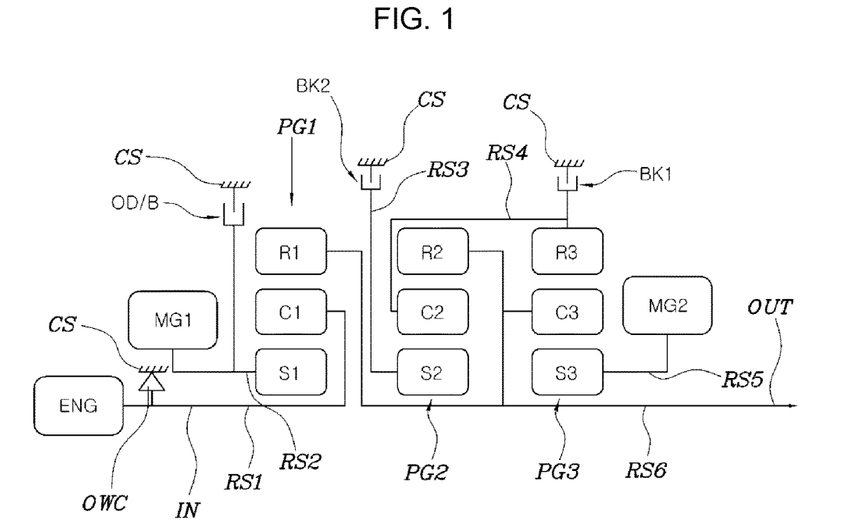
FIG. 1 illustrates the configuration of an exemplary transmission for a hybrid vehicle according to the present invention.
Figure 2:
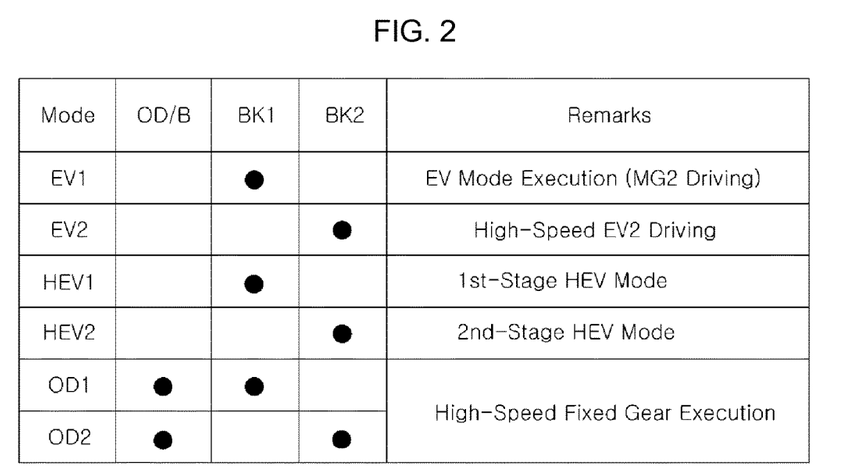
FIG. 2 is an operation mode table in which operation modes that can be realized by the exemplary transmission illustrated in FIG. 1 are presented.

Referring to FIG. 1, a transmission for a hybrid vehicle according to various embodiments of the present invention includes an input shaft IN into which power from an engine ENG is input, an output shaft OUT coaxial with the input shaft N, a first planetary gear set PG1, a second planetary gear set PG2, and a third planetary gear set PG3 disposed between the input shaft IN and the output shaft OUT to transmit rotational force, each of the first to third planetary gear sets PG1 to PG3 having three rotary elements, a first motor generator MG1 and a second motor generator MG2 each connected to the three rotary elements of the first to third planetary gear sets PG1 to PG3, and at least three shifting elements each connected to the three rotary elements of the first to third planetary gear sets PG1 to PG3.

The first rotary element of the first planetary gear set PG1 is continuously connected to the first motor generator MG1, and can be fixed by one of the shifting elements. The second rotary element of the first planetary gear set PG1 is continuously connected to the input shaft N. The third rotary element of the first planetary gear set PG1 is continuously connected to the third rotary element of the second planetary gear set PG2, the second rotary element of the third planetary gear set PG3, and the output shaft OUT.

The first rotary element of the second planetary gear set PG2 can be fixed by another one of the shifting elements. The second rotary element of the second planetary gear set PG2 can be fixed by the other one of the shifting elements, and is continuously connected to the third rotary element of the third planetary gear set PG3. The first rotary element of the third planetary gear set PG3 is continuously connected to the second motor generator MG2.

The first planetary gear set PG1, the second planetary gear set PG2, and the third planetary gear set PG3 are sequentially arranged along the axial direction of the input shaft N and the output shaft OUT.

The shifting element enabling the second rotary element of the second planetary gear set PG2 to be fixed is a first brake BK1 disposed between the second rotary element of the second planetary gear set PG2 and a transmission casing CS. The shifting element enabling the first rotary element of the second planetary gear set PG2 to be fixed is a second brake BK2 disposed between the first rotary element of the second planetary gear set PG2 and the transmission casing CS. The shifting element enabling the first rotary element of the first planetary gear set PG1 to be fixed is an overdrive brake OD/B disposed between the first rotary element of the first planetary gear set PG1 and the transmission casing CS.

In addition, a rotation restraining element able to restrain rotation of the input shaft IN is disposed on the input shaft IN.

For example, the rotation restraining element is implemented as a one-way clutch OWC disposed between the input shaft IN and the transmission casing CS, allowing the input shaft IN to rotate only in a single direction. Alternatively, the rotation restraining element may be implemented as a two-way clutch or a brake. When the engine does not operate, the rotation restraining element serves to prevent the engine from reversely rotating.

According to various embodiments, the first rotary element, the second element, and the third element of the first planetary gear set PG1 are a first sun gear 51, a first carrier C1, and a first ring gear R1. The first rotary element, the second element, and the third element of the second planetary gear set PG2 are a second sun gear S2, a second carrier C2, and a second ring gear R2. The first rotary element, the second element, and the third element of the third planetary gear set PG3 are a third sun gear S3, a third carrier C3, and a third ring gear R3.

The present invention as described above can be embodied as follows.

The transmission for a hybrid vehicle according to the present invention includes a first planetary gear set PG1, a second planetary gear set PG2, and a third planetary gear set PG3, each of which has three rotary elements; three shifting elements able to variably provide frictional force, a first motor generator MG1 and a second motor generator MG2; and six rotary shafts connected to the three rotary elements of the planetary gear sets.

The first rotary shaft RS1 is the input shaft directly connected to the second rotary element of the first planetary gear set PG1. The second rotary shaft RS2 is directly connected to the first rotary element of the first planetary gear set PG1 and the first motor generator MG1. The third rotary shaft RS3 is directly connected to the first rotary element of the second planetary gear set PG2. The fourth rotary shaft RS4 is directly connected to the second rotary element of the second planetary gear set PG2 and the third rotary element of the third planetary gear set PG3. The fifth rotary shaft RS5 is directly connected to the first rotary element of the third planetary gear set PG3 and the second motor generator MG2. The sixth rotary shaft RS6 is the output shaft OUT directly connected to the third rotary element of the first planetary gear set PG1, the third rotary element of the second planetary gear set PG2, and the second rotary element of the third planetary gear set PG3.

From among the three shifting elements, the first brake BK1 is disposed between the fourth rotary shaft RS4 and the transmission casing CS, the second brake BK2 is disposed between the third rotary shaft RS3 and the transmission case CS, and the overdrive brake DO/B is disposed between the second rotary shaft RS2 and the transmission casing CS.

The first planetary gear set PG1, the second planetary gear set PG2, and the third planetary gear set PG3 are sequentially arranged along the axial direction of the input shaft IN and the output shaft OUT.

A description of the operation of the various embodiments as configured above will be now given with reference to FIGS. 2 to 10.

Figure 3:
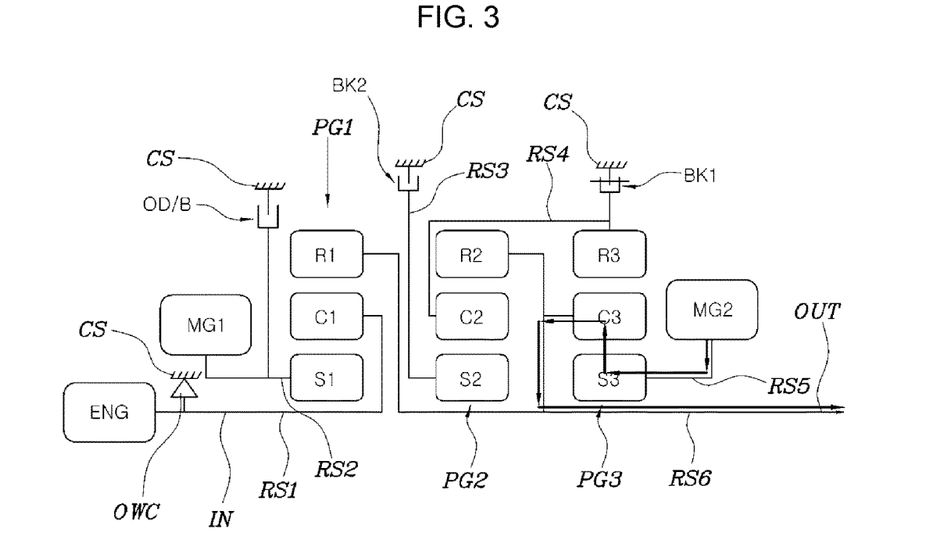
FIG. 3 illustrates the state in which the exemplary transmission illustrated in FIG. 1 realizes an EV1 mode.
Figure 4:
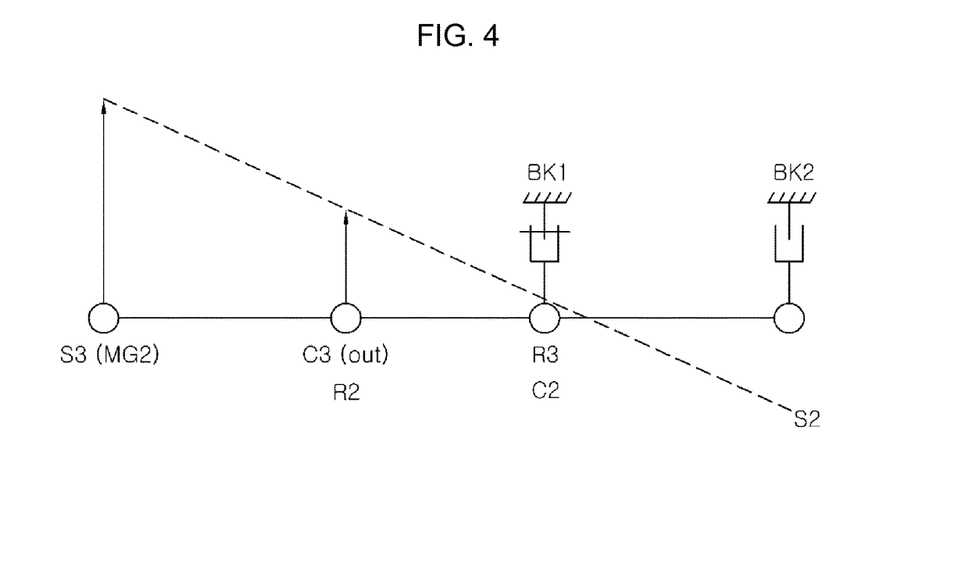
FIG. 4 is a lever diagram in which the state of FIG. 3 is expressed as a lever.

FIG. 3 and FIG. 4 illustrate the state in which the transmission according to the present invention realizes an EV1 mode. In this state, the engine is stopped, and the rotation restraining element can operate to prevent the engine from rotating reversely. Since only the first brake BK1 from among the shifting elements is activated to fix the fourth rotary shaft RS4, the second sun gear S2 and the third ring gear R3 are fixed. Consequently, power generated by the motor generator(s) is output to the output shaft OUT after being reduced by the second ring gear R2 and the third carrier C3.

Figure 5:
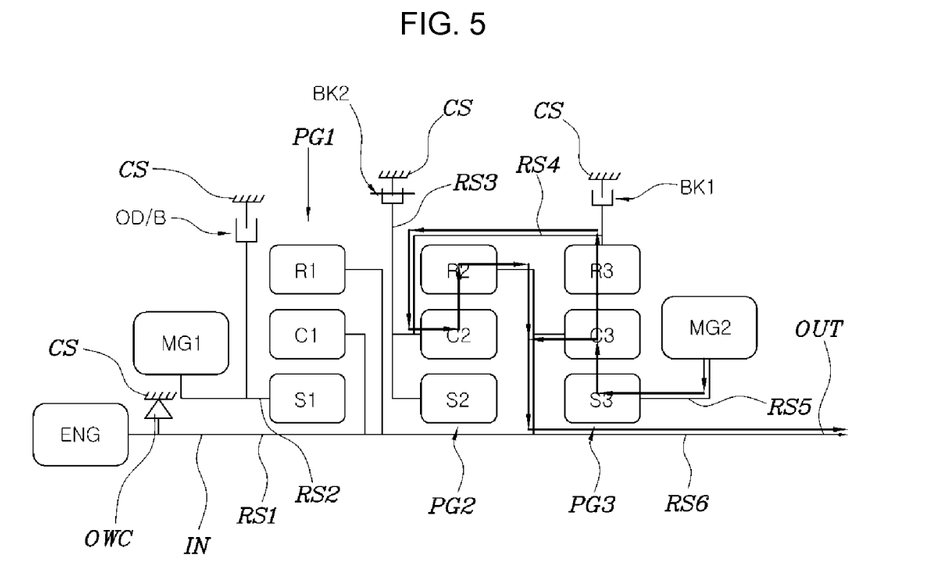
FIG. 5 illustrates the state in which the exemplary transmission illustrated in FIG. 1 realizes an EV2 mode.
Figure 6:
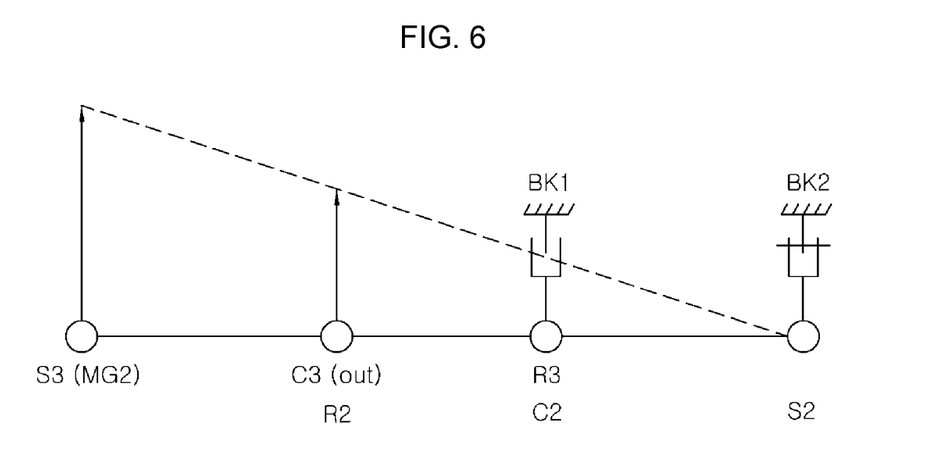
FIG. 6 is a lever diagram in which the state of FIG. 5 is expressed as a lever.

FIG. 5 and FIG. 6 illustrate the state in which an EV2 mode is realized. In this state, the engine is stopped, and only the second brake BK2 is activated to fix the third rotary shaft RS3 and the second sun gear S2. Power generated by the second motor generator MG2 is reduced by a reduction ratio smaller than that in the EV1 mode. Consequently, output power having a higher speed is outputted to the output shaft OUT.

As described above, the present invention provides a configuration able to reduce power generated by the second motor generator by a two-stage gear ratio. It is therefore possible to obtain an intended level of output power of a vehicle while reducing the size of the second motor generator. This can consequently reduce the weight of the vehicle and increase the energy efficiency of the vehicle, thereby significantly improving the fuel efficiency of the vehicle.

Figure 7:
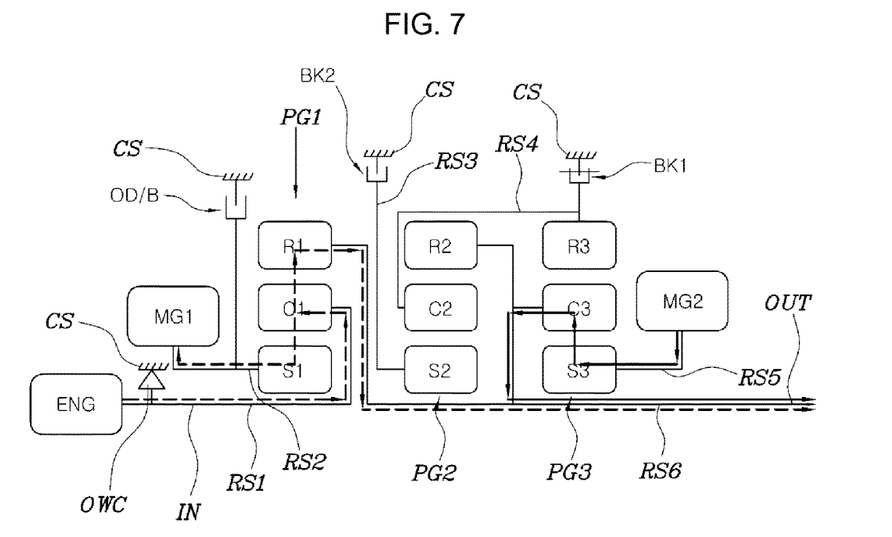
FIG. 7 illustrates the state in which the exemplary transmission illustrated in FIG. 1 realizes an HEV1 mode.

FIG. 7 illustrates the state in which an HEV1 mode is realized. Referring to FIG. 7, as in the situation illustrated in FIG. 3, power generated by the second motor generator MG2 is in the state in which only the first brake BK1 is activated. In addition, the engine ENG generates power, a portion of which is transmitted to the output shaft OUT, and the rest of which is transmitted to the first motor generator MG1, which in turn generates electricity.

Figure 8:
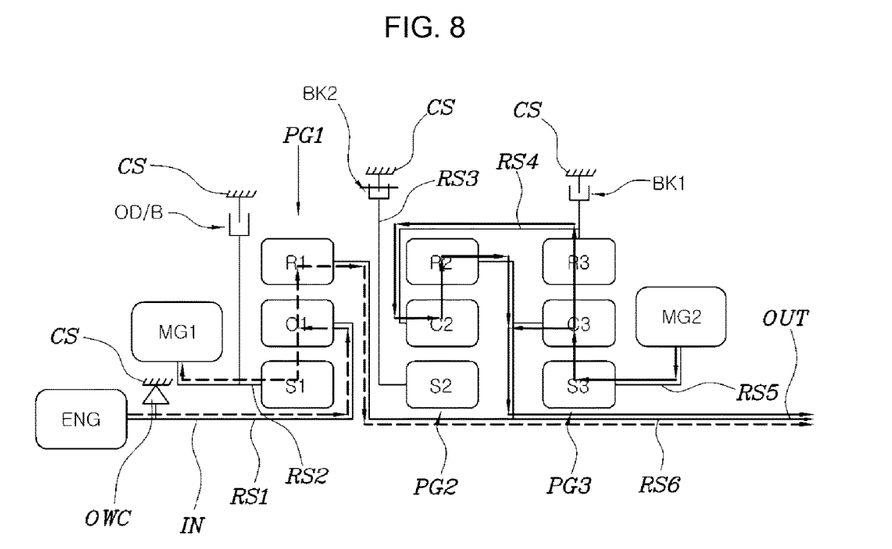
FIG. 8 illustrates the state in which the exemplary transmission illustrated in FIG. 1 realizes an HEV2 mode.

FIG. 8 illustrates the state of an HEV2 mode. Referring to FIG. 8, as in the situation illustrated in FIG. 5, power generated by the second motor generator MG2 is transmitted to the output shaft OUT in the state in which only the second brake BK2 is activated. In addition, power simultaneously provided by the engine ENG diverges to the output shaft OUT and the first motor generator MG1.

Figure 9:
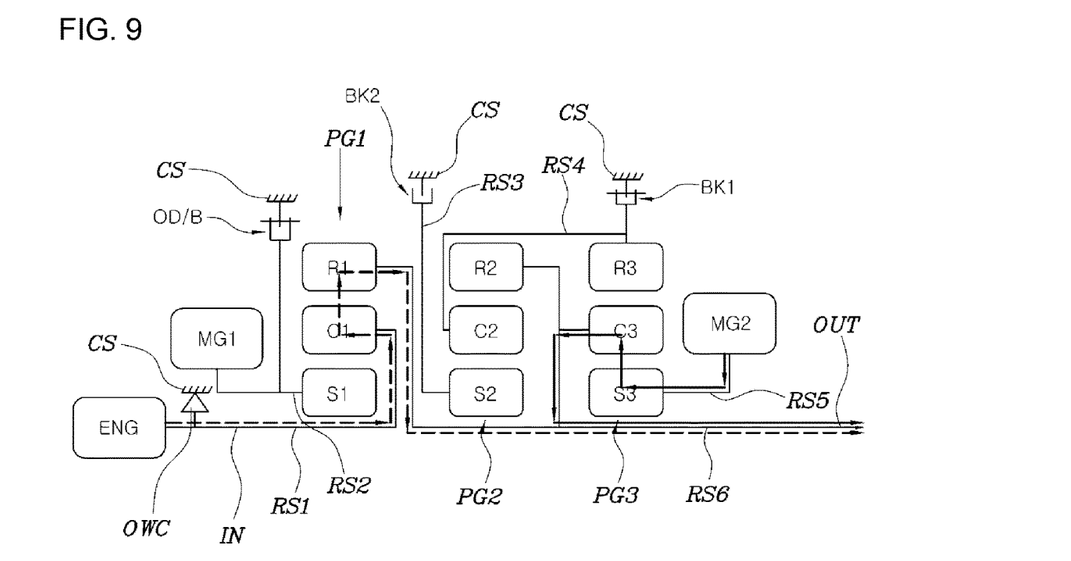
FIG. 9 illustrates the state in which the exemplary transmission illustrated in FIG. 1 realizes an OD1 mode.

FIG. 9 illustrates an overdrive 1 (OD1) mode. Referring to FIG. 9, since both the first brake BK1 and the overdrive brake OD/B are activated, power generated by the second motor generator MG2 is reduced and subsequently transmitted to the output shaft OUT along the same paths as in FIG. 3. Since the first sun gear 51 is fixed, power generated by the engine ENG is directly outputted to the output shaft OUT after being increased by the first ring gear R1.

Figure 10:
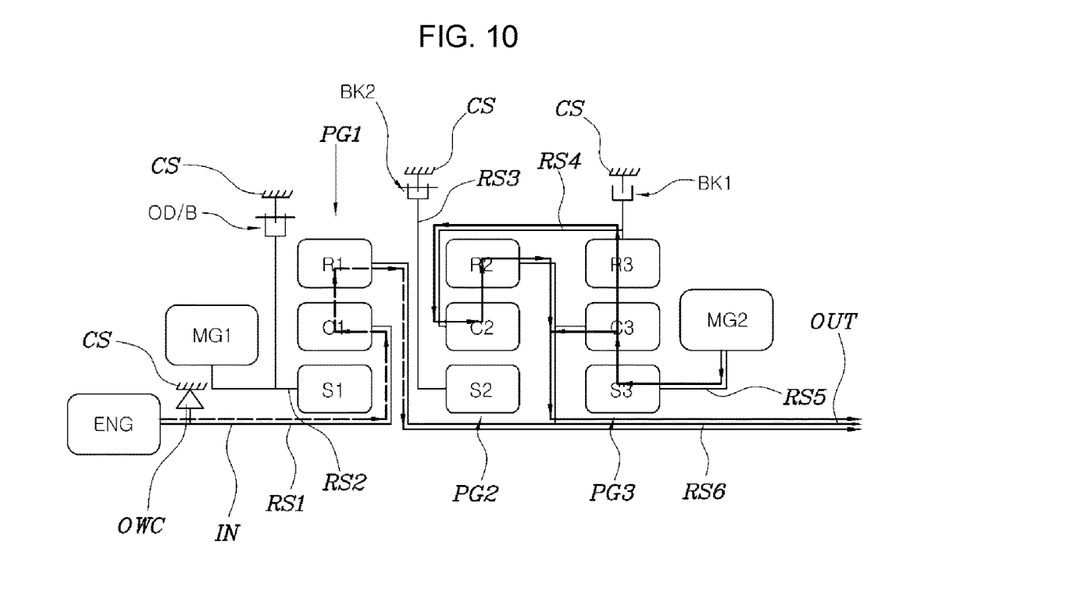
FIG. 10 illustrates the state in which the exemplary transmission illustrated in FIG. 1 realizes an OD2 mode.

FIG. 10 illustrates an OD2 mode. Referring to FIG. 10, both the second brake BK2 and the overdrive brake OD/B are activated, power generated by the second motor generator MG2 is reduced and subsequently transmitted to the output shaft OUT along the same paths as in FIG. 5. Power generated by the engine ENG is directly outputted to the output shaft OUT after being increased by the first ring gear R1.

Referring to the situations in FIG. 9 and FIG. 10, in the state in which the vehicle travels at a high speed, power generated by the engine is entirely transmitted to the output shaft at a high speed without diverging to the first motor generator, whereby the high-speed driving performance and efficiency of the vehicle can be improved.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A transmission for a hybrid vehicle comprising:
   an input shaft into which power generated by an engine is input;
   an output shaft disposed coaxially with the input shaft;

a first planetary gear set, a second planetary gear set, and a third planetary gear set disposed between the input shaft and the output shaft to transmit rotational force, each of the first to third planetary gear sets having first, second and third rotary elements;

a first motor generator and a second motor generator each connected to the first to third rotary elements of the first to third planetary gear sets; and at least three shifting elements each connected to the first to third rotary elements of the first to third planetary gear sets, wherein the first rotary element of the first planetary gear set is continuously connected to the first motor generator, and is fixable by a first shifting element of the shifting elements, the second rotary element of the first planetary gear set is continuously connected to the input shaft, and the third rotary element of the first planetary gear set is continuously connected to the third rotary element of the second planetary gear set, the second rotary element of the third planetary gear set, and the output shaft, wherein the first rotary element of the second planetary gear set is fixable by a second shifting element of the shifting elements, the second rotary element of the second planetary gear set is fixable by a third shifting element of the shifting elements, and is continuously connected to the third rotary element of the third planetary gear set, and wherein the first rotary element of the third planetary gear set is continuously connected to the second motor generator.

2. The transmission according to claim 1, wherein the first planetary gear set, the second planetary gear set, and the third planetary gear set are sequentially arranged along an axial direction of the input shaft and the output shaft.

3. The transmission according to claim 2, wherein the third shifting element fixing the second rotary element of the second planetary gear set is a first brake disposed between the second rotary element of the second planetary gear set and a transmission casing, the second shifting element fixing the first rotary element of the second planetary gear set is a second brake disposed between the first rotary element of the second planetary gear set and the transmission casing, and the first shifting element fixing the first rotary element of the first planetary gear set is an overdrive brake disposed between the first rotary element of the first planetary gear set and the transmission casing.

4. The transmission according to claim 1, further comprising a rotation restraining element on the input shaft, the rotation restraining element being able to restrain rotation of the input shaft.

5. The transmission according to claim 4, wherein the rotation restraining element comprises a one-way clutch disposed between the input shaft and a transmission casing, allowing the input shaft to rotate only in a single direction.

6. A transmission for a hybrid vehicle comprising:

a first planetary gear set, a second planetary gear set, and a third planetary gear set, each of which has first, second and third rotary elements;

three shifting elements able to variably provide frictional force;

a first motor generator and a second motor generator; and first, second, third, fourth, fifth, and sixth rotary shafts connected to the three rotary elements of the planetary gear sets, wherein the first rotary shaft comprises an input shaft directly connected to the second rotary element of the first planetary gear set, wherein the second rotary shaft is directly connected to the first rotary element of the first planetary gear set and the first motor generator, wherein the third rotary shaft is directly connected to the first rotary element of the second planetary gear set, wherein the fourth rotary shaft is directly connected to the second rotary element of the second planetary gear set and the third rotary element of the third planetary gear set, wherein the fifth rotary shaft is directly connected to the first rotary element of the third planetary gear set and the second motor generator, wherein the sixth rotary shaft comprises an output shaft directly connected to the third rotary element of the first planetary gear set, the third rotary element of the second planetary gear set, and the second rotary element of the third planetary gear set, and wherein the three shifting elements comprise a first brake disposed between the fourth rotary shaft and a transmission casing, a second brake disposed between the third rotary shaft and the transmission case, and an overdrive brake disposed between the second rotary shaft and the transmission casing.

7. The transmission according to claim 6, wherein the first planetary gear set, the second planetary gear set, and the third planetary gear set are sequentially arranged along an axial direction of the input shaft and the output shaft.

* * * * *